United States Patent Office 3,029,045
Patented Apr. 10, 1962

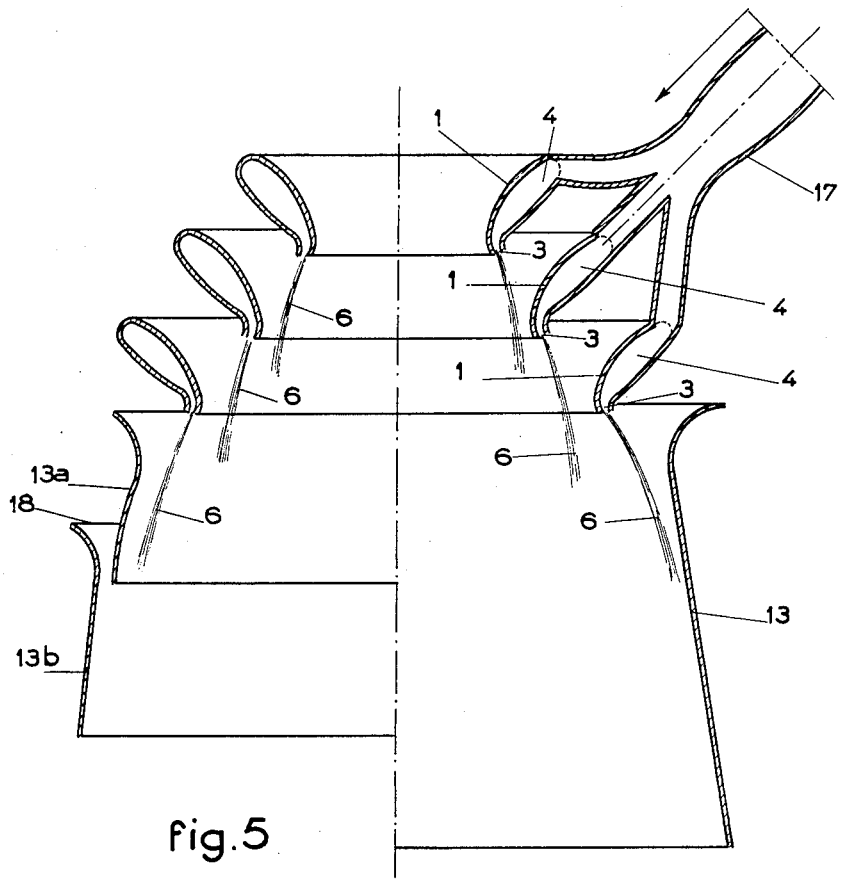

3,029,045
EJECTOR SYSTEMS APPLICABLE TO THRUST GENERATION OR AUGMENTATION
Jean Henri Bertin, Neuilly-sur-Seine, and Marcel Pierre Le Nabour, Montreuil-sous-Bois, France, assignors to Societe Bertin & Cie., Paris, France, a company of France
Filed Aug. 12, 1958, Ser. No. 754,641
Claims priority, application France Aug. 28, 1957
8 Claims. (Cl. 244—12)

The present invention relates to ejector systems wherein a flow is induced by a high-momentum jet of compressed air or other motive fluid under pressure and more particularly to the application of such systems to generate or augment thrust for propulsive or lifting purposes.

An object of this invention is to provide a modified form of ejector system, of simpler construction and more efficient operation than conventional ejectors.

In accordance with the invention, an ejector system is provided which comprises a duct bounded by a physical convergent wall and a nozzle extending along the periphery of the narrow open end of said duct and directed so as to form, when supplied with auxiliary pressure fluid, a divergent fluid jet extending the convergent physical wall and constituting therewith a Venturi.

Another object of the invention is to improve the thrust and efficiency of such a solid-fluid convergent-divergent pipe or conduit.

In accordance with a feature of this invention, a fan is provided at the throat portion of the physical convergent wall in order to accelerate the main fluid stream.

In accordance with another feature of this invention, a cascade of such pipes or conduits is provided, along the flow path of the main stream, the momentums of the successive jets of auxiliary fluid being in geometrical progression.

In the accompanying drawings:

FIGURES 4 and 5 are axial half sections of a pipe system with a cascade of elements, showing two forms of the invention.

Figure 1:
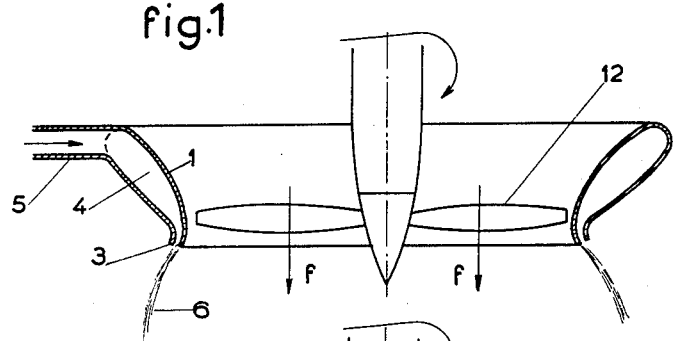
FIGURES 1 to 3 are axial sections of three solid-fluid convergent-divergent pipes combined with a screw or fan and adapted for lift production.

In the drawings, 1 is the physical wall of a convergent section, 3 an annular slot-like nozzle designed for forming a divergent fluid screen jet 6, 4 a manifold feeding this nozzle with pressure fluid supplied through pipe 5.

Figure 2:
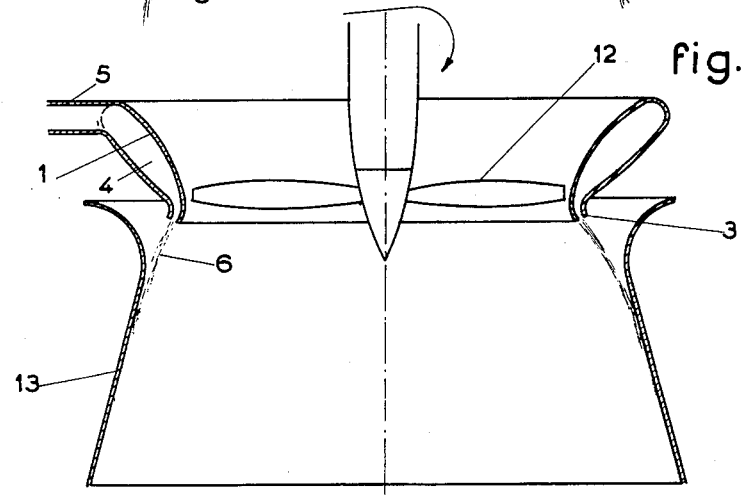
Figure 3:
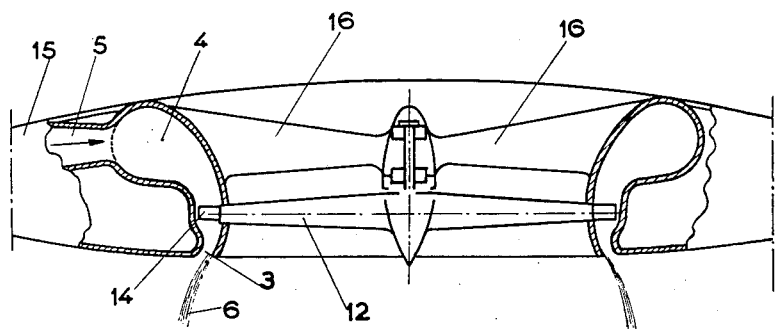

In FIGURES 1, 2 and 3, the main stream flowing through the solid convergent-fluid divergent tube 1, 3, 4, 5, 6 is accelerated by a fan 12 rotating about the axis of this tube. If this axis is vertical and if the stream flows downwards, as shown by the arrows $f$, the arrangement may serve to sustain an aircraft, the lift being due to the resultant of the vacuum on the physical wall of the convergent section of the tube and of the reaction of air on the fan.

Tests have shown that the operation and efficiency of such an arrangement are improved when the fan is positioned near the throat section of the convergent.

The divergent screen formed at the trailing edge of pipe 1 and which constitutes a duct around the fan 12, is very convenient because, among other advantages, it prevents the usual narrowing of the wake of this fan and thus improves the connection of the lifting stream flowing downwards, with the atmosphere downstream of the fan, by progressively reducing the velocity of this stream, which tends to increase the thrust.

If the fan 12 is positioned at the throat of the pipe, i.e. near the plane of the slot 3 which forms the fluid screen, it is then at the point of maximum velocity of the flow and can therefore transmit more power for a given diameter or else have a smaller diameter for a given power.

As shown in FIGURE 2, a divergent duct 13 is provided at a distance from the throat, the outline and position of this duct 13 being such that the fluid screen merges tangentially with the inner wall of the duct. The latter thus extends the divergent section of the Venturi and furthers the reduction in speed of the main stream in the zone wherein the fluid screen has lost any effectiveness.

In the case of FIGURE 3, the fan 12 is driven by the auxiliary fluid supplied to the nozzle 3. It carries vanes 14 extending through the annular manifold 4 and acting as turbine blades. The fluid flowing through the manifold 4 and which may be hot gas issuing from a gas turbine engine or a free piston gas generator, is subjected to two successive expansions, one through the vanes 14 for rotating the fan 12, the other through the nozzle 3 to form the screen-like jet.

The arrangement of FIGURE 3 is shown as applied to an aircraft wing 15 in which the whole arrangement is housed, the shaft of the fan being journaled in struts 16. This arrangement may be completed by a divergent duct such as 13 in FIGURE 2.

In the embodiment shown in FIGURE 4, several convergent-divergent pipes 1, 3, 4, 5, 6 are arranged in cascade, their diameters increasing in the direction of the main stream; the last pipe 1, 3, 4, 5, 6 cooperates with a divergent duct 13 similar to that of FIGURE 2.

The successive fluid screen-like jets are given momentums (product of the mass-flow of fluid by the ejection velocity) which increase as a geometrical progression. This may be obtained by adjusting separately the pressures in the various manifolds 4 or more conveniently by giving the slots 3 diameters which increase as a geometrical progression but a same width, this allows feeding all the manifolds 4 at the same pressure, from a common source of pressure fluid 17.

The modified form of FIGURE 5 differs from the preceding one in that the final divergent duct 13 is divided into two ducts 13a and 13b separated by an auxiliary inlet 18 for ambient fluid. It is thus possible to reduce the over-all length required for dampening the velocity of the main stream. The downstream duct 13b has preferably a divergence which is smaller than that of the upstream duct 13a.

What is claimed is:

1. A fluid entraining device comprising, in combination, a convergent duct bounded by a solid wall and having an upstream end and a downstream end open to the ambient medium, a nozzle extending at the periphery of the downstream end of said convergent duct and oriented in a divergent direction substantially tangent to said wall, means for supplying pressure fluid to said nozzle and said nozzle being constructed to form a jet which defines a divergent fluid wall extending the solid wall of the convergent duct and forming therewith a hybrid Venturi, and motive means disposed coaxially with said duct for circulating therethrough fluid from the ambient medium, a generally divergent duct bounded by a solid wall and open at both ends, said divergent duct extending downstream of said convergent duct and around the flow path of the divergent jet.

2. A device as defined in claim 1, wherein the generally divergent duct comprises an upstream end around the convergent duct and radially spaced therefrom.

3. A fluid entraining device comprising, in combination, a convergent duct bounded by a solid wall and having an upstream end and a downstream end open to the ambient medium, a nozzle extending at the periphery of the downstream end of said convergent duct and oriented in a divergent direction substantially tangent to said wall, means for supplying pressure fluid to said nozzle and said nozzle being constructed to form a jet which defines a divergent fluid wall extending the solid wall of the convergent duct and forming therewith a hybrid Venturi, and motive means disposed coaxially with said duct for circulating therethrough fluid from the ambient medium, motive means comprise a second convergent duct bounded by a second solid wall and having an upstream end and a downstream end open to the ambient medium, a second nozzle extending at the periphery of the downstream end of said second convergent duct and oriented in a divergent direction substantially tangent to said second wall, and means for supplying pressure fluid to said second nozzle and said second nozzle being constructed to form a jet which defines a divergent fluid wall extending the solid wall of the second convergent duct and forming therewith a hybrid Venturi.

4. A device as defined in claim 3, wherein the pressure fluid supply means comprise a common source of pressure fluid connected with said nozzles, the area of the downstream nozzle being substantially greater than the area of the upstream nozzle.

5. A jet augmenter comprising, in combination, a convergent duct defined by a wall, means for forming a fluid wall to define a divergent duct bounded by said fluid wall extending from said first-named wall, said means for forming said fluid wall comprising nozzle means extending along and outside the periphery of the downstream end of the said convergent duct, said nozzle means opening in a direction which diverges from the axis of said convergent duct, conduit means for supplying gas to said nozzle means at a substantial overpressure in relation to the ambient pressure, whereby a fluid jet issues from said nozzle means and forms said fluid wall, fan blades disposed within the portion of least cross-sectional area of said convergent duct and rotatable about said axis, and turbine blades extending into said conduit means with said turbine blades being mechanically connected to said fan blades, whereby said gas in its passage toward said nozzle means partially expands through said turbine blades before it reaches said nozzle means, whereby said turbine blades are driven by the same gas which issues from said nozzle means and said fan blades are driven by said turbine blades.

6. A jet augmenter as defined in claim 5, wherein said turbine blades are integral with said fan blades and extend at the periphery thereof.

7. In an aircraft wing bounded by an upper surface and a lower surface, a lift augmenter comprising a passage through said wing having a substantially vertical axis and defined by a downwardly convergent wall and means for forming a fluid wall to define a divergent duct under said convergent wall bounded by said fluid wall extending from said first-named wall, said means for forming said fluid wall comprising nozzle means extending along and outside the periphery of the lowermost end of the said passage, said nozzle means opening in a direction which diverges from said axis, conduit means for supplying said nozzle means with gas at a substantial overpressure in relation with the ambient pressure, whereby a fluid jet issues from said nozzle means and forms said fluid wall, fan blades disposed within the lower section of said convergent duct and rotatable about said axis, and turbine blades extending into said conduit means, said turbine blades being mechanically connected to said fan blades, whereby said gas in its passage toward said nozzle means drives said turbine blades which in turn drive said fan blades and said fan blades are thereby driven by the same gas which issues from said nozzle means, and air flows downwards within said convergent-divergent wall and is impelled by said fan blades driven by said turbine blades to provide lift thrust.

8. A lift augmenter in an aircraft wing as defined in claim 7, wherein said turbine blades are integral with said fan blades and extend at the periphery thereof.

References Cited in the file of this patent

UNITED STATES PATENTS

| 1,822,081 | Coppus | Sept. 8, 1931 |
| 2,922,277 | Bertin | Jan. 26, 1960 |
| 2,940,689 | Howell | June 14, 1960 |

FOREIGN PATENTS

| 866,053 | France | June 16, 1941 |
| 56,265 | Australia | May 26, 1913 |